Figure 1:
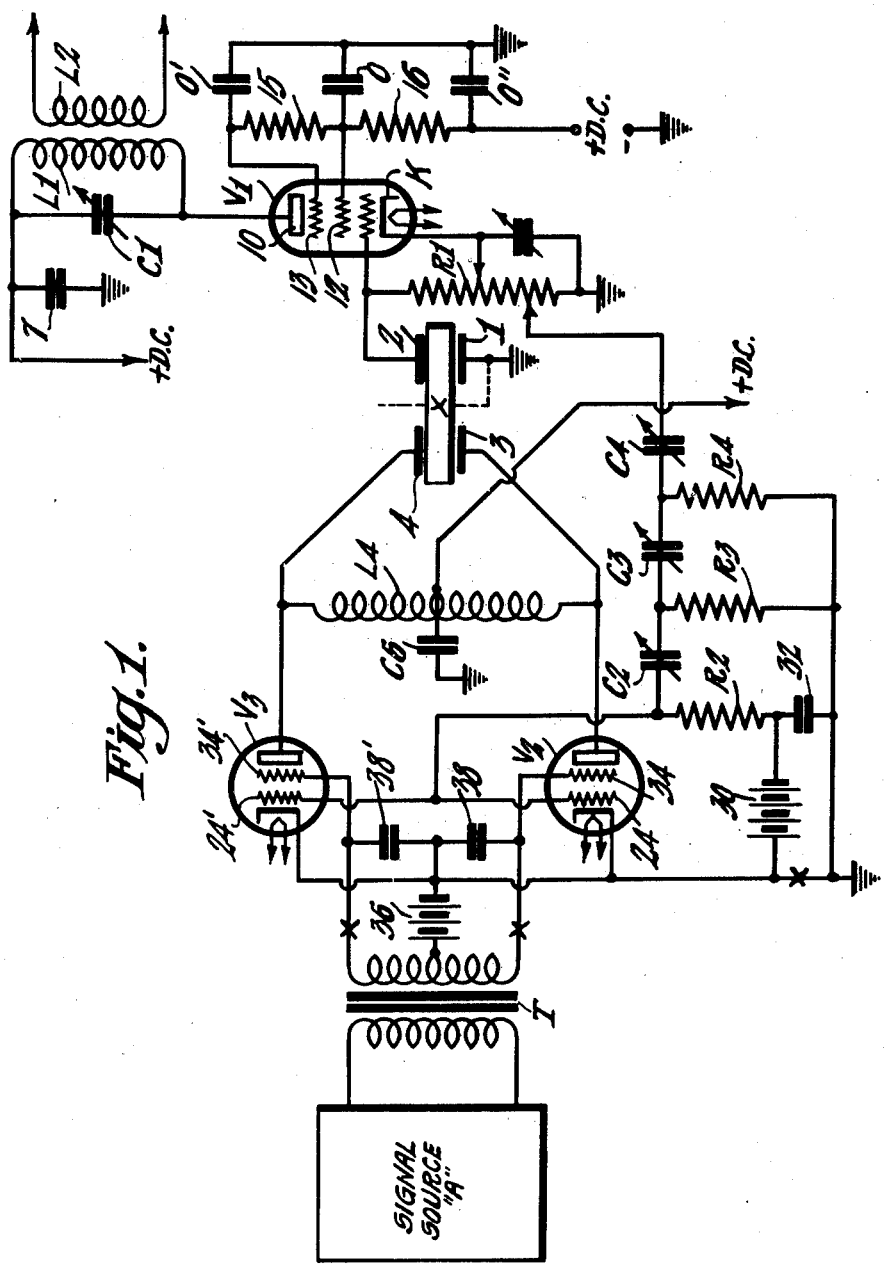

March 8, 1949.  G. L. USSELMAN  2,463,661

FREQUENCY MODULATION

Filed April 3, 1946  2 Sheets-Sheet 2

INVENTOR
George L. Usselman
BY
ATTORNEY

Patented Mar. 8, 1949

2,463,661

UNITED STATES PATENT OFFICE 2,463,661

FREQUENCY MODULATION

George L. Usselman, Port Jefferson, N. Y., assignor to Radio Corporation of America, a corporation of Delaware Application April 3, 1946, Serial No. 659,233

4 Claims. (Cl. 332—24)

1

This application discloses an improved means for producing wave energy the timing of which is modulated in accordance with signals.

In the improved system of the present application, I make use of the principle involved in my U. S. Patent #2,298,436, U. S. Patent #2,298,437, U. S. Patent #2,298,438, and U. S. application Serial #495,459, filed July 20, 1943, now Patent No. 2,399,268 dated April 30, 1946.

In systems of this type the oscillations to be timing modulated are developed in a first electron discharge device, are fed by coupling means there from to a second tube (or tubes) which may be termed the modulator tube, are amplified in the second tube and fed from the anode by coupling means back to the generator circuit. A phase shifting means is provided in one of the couplings so that the voltages fed back to the generator are in phase displaced relation with respect to the generated voltage. This phase displaced voltage combines with the generated voltage to produce a resultant of a predetermined phase with respect to the generated voltage in the absence of modulation. When the component fed back is amplitude modulated by controlling the second tube the phase of this resultant varies to vary the phase of excitation of an electrode in the generator, and as a consequence of the voltage fed back to the modulator tube and returned to the generator, so that the effect is cumulative and the timing of the oscillations generated is modulated.

The object of the present invention is to provide an improved system of this type having an oscillator that, except for the oscillator frequency determining circuit, which may be a crystal, is aperiodic or untuned, and a balanced modulator tube arrangement having two tubes with their grids coupled for excitation to the generator by a coupling and phase shifting network which is untuned, and having their anodes coupled back to the generator by a tuned balanced circuit. This tuned balanced circuit and its operation is a feature of the present invention. In this improved system the crystal has two pairs of electrodes, a pair of which are in the generating circuit, and a pair of which are differentially coupled to the anode tuned circuit of the modulators. The phase shifting means may be in either of the couplings between the modulator tube and the oscillation generator. In the embodiment illustrated it is in the coupling between the input electrodes of the modulator tube and the oscillation generating circuit. The phase shifter, per

2 se, comprises several stages of resistance and capacity.

Numerous advantages are obtained by the use of my improved system. For example, since the modulator tubes are excited at their inputs by voltages of the same phase and have their outputs opposed at the crystal holder electrode, no oscillations are developed in the output circuit of the modulator in the absence of modulation, and the oscillator then operates independently. Since control of the generator frequency is solely through control of the radio frequency excitation of a separate pair of crystal electrodes it is obvious that little or no amplitude modulation of the generated wave is produced. This is a very desirable feature and reduces the need of amplitude limiting in succeeding stages.

The system is adapted to timing modulation of wave energy in accordance with signals such as voice, etc., and also to timing modulation in accordance with telegraphy signals, in which case the output is keyed spaced waves, i. e., comprises a carrier and side bands resulting from keying which carrier shifts from a first frequency which may be called the spacing frequency to a second frequency which may be called the marking frequency. These systems are known in the art as frequency shift telegraphy systems.

In the detailed description which follows, reference is made to the attached drawings. In the drawings Figs. 1, 2a and 2b each show an embodiment of my improved wave generating and wave timing modulating system.

In Fig. 1 of the drawings, tube VI, which is a generator tube, has an anode 10 connected to a tank circuit comprising condenser C1 and inductance L1, from which the timing modulation oscillations are induced into an inductance L2 and supplied to additional frequency multipliers, amplitude limiters, etc., before use or more directly to radiating means. The tube VI has an electrode 12, a control grid, and a cathode K coupled in an oscillation generating circuit including piezoelectric crystal X. This oscillator circuit is of the grounded anode type, wherein electrode 12 serves as the anode and is grounded by radio frequency bypass condenser 0. The grid 13 is grounded for radio frequency by condenser 0' and is connected to the direct current source by resistances 15 and 16. The source is shunted by capacitor 0".

The tube VI may be of the tetrode type (4 elements) having a control grid, a screen grid 12, a cathode and anode. The tube VI shown in Fig. 1 is a pentode (5 elements). The suppressor or third grid 13 may be desirable in some cases to obtain better or additional shielding of the electron coupled anode which is connected to the output circuit. Grid 13 is also beneficial in suppressing secondary emission of electrons from the anode 10, when the resistor 15 is of the correct size, thereby providing more stable operation.

Oscillations are generated by virtue of the fact that the crystal X is in effect connected between the control grid and anode grid 12, and the tube V1 operates normally by crystal control through electrodes 1 and 2, causing the crystal to vibrate mechanically and also electrically. That is, coincidental with mechanical vibrations alternating + and − electrical charges appear on the crystal faces which in turn, by condenser action, alternately charge + and − the electrodes 1 and 2. The mechanical inertia supplies the inductive effect so that the crystal acts like a tuned circuit for tube V1. The oscillating voltages of the electrode 12 and of the control grid are of opposed phase, while the cathode is tapped up on resistance R1 and the voltage thereat is of the same phase as the voltage at the grid electrode 12 but of less magnitude. The operation of this oscillator wherein oscillations are generated and fed by the electron stream to the circuit C1, L1, is substantially as described in the patents mentioned above and is well known in the art.

The control grid 24 of tube V2 and control grid 24' of tube V3, tubes V2 and V3 being the modulator tubes, are coupled by a multi-stage phase shifting network including capacitors C2, C3 and C4 and resistors R2, R3 and R4 to a point on the resistor R1, so that voltage of the generated frequency is fed to the control grids 24 and 24'. The phases of the voltages fed to the grids 24 and 24' are alike and are shifted by the network with respect to the phase of the voltages in the resistor R1 and on the grid of the generator. These voltages are amplified in tubes V2 and V3, reversed in phase and fed from the anodes thereof to the opposite ends of an inductance L4 the center point of which is grounded for radio frequency by blocking and bypass condenser C6. The outputs of tubes V2 and V3 are differential or in pushpull relation and are so coupled to plates 3 and 4 on crystal X. The control grids 24 and 24' are also coupled by grid resistor R2 to a biasing source 30 shunted by an R. F. bypassing capacitor 32. The screen grids 34 and 34' are connected to the secondary winding of a transformer T, the primary winding of which is coupled to a signal source A. A direct current source 36 shunted by radio frequency bypass condenser 38 and 38' is in the circuit of the secondary winding of transformer T. The anodes of V2 and V3 derive their potential by way of inductance L4 a point on which is connected to the direct current source.

The operation of the modification illustrated in Fig. 1 will now be described. Tube V1 operates in a grounded anode type of oscillator circuit such as, for example, illustrated in Fig. 1 of Usselman U. S. Patent #2,298,437. The crystal X is the only frequency determining element in this generator. The output circuit C1, L1, L2 is electronically coupled to the oscillation generating electrodes and circuits. The inductance L1 also serves as a supply circuit between the direct current source and the anode 10 of tube V1, the direct current source being shunted by radio frequency bypass condenser 7. The electrode 12 acts as the anode of the grounded anode oscillator with the control grid and cathode K in the oscillation generating circuit. Resistors 15 and 16 act as aperiodic smoothing impedances to keep radio frequency of the generated frequency out of the direct current circuit for the electrodes 12 and 13 and out of the source. The electrode 13 is a shielding electrode, being grounded substantially directly for radio frequency currents by condenser 9'. The crystal is in the oscillation generating circuit and oscillations will be generated in the circuit of a frequency determined in part by the dimensions of the crystal when proper potentials are applied to circuit and tube electrodes. The generated radio frequency voltage on the cathode K of tube V1 is coupled to the control grid of tube V1 through the inter electrode capacity and through resistor R1. The control grid then operates at a radio frequency voltage of a first phase which voltage appears across the electrodes 2 and 1 of the crystal.

Voltage of this phase is supplied by the tap on potentiometer R1 through the phase shifting network comprising capacitor C2, resistor R2, capacitor C3, resistor R3 and capacitor C4 to the control grids 24 and 24' of the modulator tubes V2 and V3. The phase shifting network relatively changes the phase of the voltage in potentiometer resistor R1 as it is supplied cophasally to the control grids 24 and 24'. The phase shift may be about 90 degrees. The radio frequency voltages are amplified in the tubes V2 and V3 and impressed across the anode circuit including L4 and thence in pushpull or differential relation on the electrodes 4 and 3 of the crystal.

Modulator tubes V2 and V3 also cause the crystal to vibrate or rather they pull the phase or frequency of crystal vibration to a position or frequency intermediate of the two sources or causes—modulator and oscillator (tube V1). The crystal has only one mode of vibration, the frequency of which is the resultant of the combined excitation components of the modulator circuits and that of the oscillator V1 circuits. As the strength and phase of the modulator component of excitation is varied so is the frequency of the crystal oscillations varied.

As long as the tubes V2 and V3 are not modulated by a signal they deliver like phase radio frequency potentials to the electrodes 4 and 3 of the crystal. The effect on the crystal and oscillator circuit is nil and the crystal operates at a frequency determined substantially solely by the crystal, which frequency may be considered the carrier frequency. However, if signal is applied from the source A to the screen grids 34 and 34' the opposing modulating potentials differentially modulate the gains of the tubes V2 and V3 so that one thereof supplies radio frequency voltages of larger amplitude to the output circuit including inductance L4 and the radio frequency voltages thereacross become unbalanced so that a voltage is set up across the crystal electrodes 3 and 4. If one tube, say for example V2, is modulated to supply more output than V3 then the phase of this voltage which has been displaced in the phase shifting network 90 degress and is reversed in phase in the tubes V2 and V3 might be considered as of leading phase with respect to the voltage developed in the oscillator across the crystal electrodes 2 and 1, and this voltage acts to speed up the oscillator and increase the frequency of operation. Conversely, if the tube V3 has the greatest gain the resulting oscillations impressed across the electrodes 4 and 3 may be considered as being retarded in phase with respect to the phase of the oscillations generated in the oscillator and appearing across electrodes 2 and 1, these oscillations acting to slow down the operation of the system.

The inductance L4 acts as a tuned circuit operating at resonance so that no phase shift occurs therein except that the crystal electrodes 3 and 4 operate 180 degrees out of phase due to the phase reversing action that takes place in the tank circuit including inductance L4 grounded at its midpoint. If the phase of the excitation voltage diverted from the resistor R1 and fed through the network R4 C4, R2 C2, R3 C3, to the grids 24 and 24', is shifted 90 degrees, then when there is no signal both crystal electrodes 3 and 4 operate in the same phase because the voltages are in phase on the electrodes 24 and 24' and are reversed in phase by the action of tubes V2 and V3. Since they are in the same phase they contribute no excitation to the crystal and there are no oscillations in this tank circuit. If the modulating signal is applied and assuming that modulator tube V2 is supplying more voltage than tube V3, oscillations build up in the tank circuit including inductance L4 with a phase determined by the phase of the oscillations supplied by tube V2. The phase displaced excitation is applied to the crystal and the output frequency is, say, increased. On the opposite part of the signal cycle modulator tube V3 supplies more power to the tank circuit and again oscillations build up. Tube V3, however, has the same phase shifted excitation as tube V2, i.e., one advanced about 90 degrees. However, the anode of tube V3 is connected to the opposite end of the tank circuit including L4 as compared to the coupling of the anode of tube V2 thereto, and the phase of the oscillations in the tank circuit is in effect retarded 90 degrees so that the pushpull excitation applied to the crystal electrodes now causes the output frequency to decrease.

Oscillations occur in the tank circuit only when the signal is present to unbalance the modulator tubes. Because of the balanced coupling of the modulator anode circuits to the crystal electrodes no neutralizing condenser for the crystal is necessary in the crystal oscillator circuit. The use of the screening electrode 13 also lessens the need of neutralizing connections.

Figure 2A:
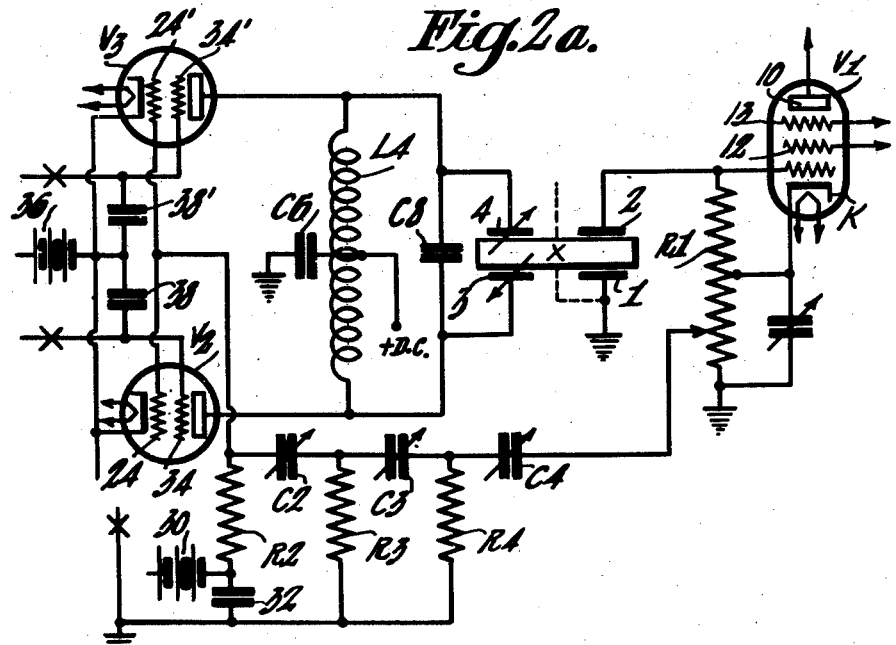

The embodiment of Fig. 2a is the same as the embodiment of Fig. 1, except that now the tank circuit including the inductance L4 is tuned by a a condenser C8. The circuit may now be considered a tuned resonant circuit tuned to the crystal frequency. This produces better pushpull action of the R. F. potentials applied to the crystal electrodes 3 and 4 during modulation. This tuning reduces distortion of the signal providing the condenser C8 is not made too large. If C8 is too large it will act like a filter.

Figure 2B:
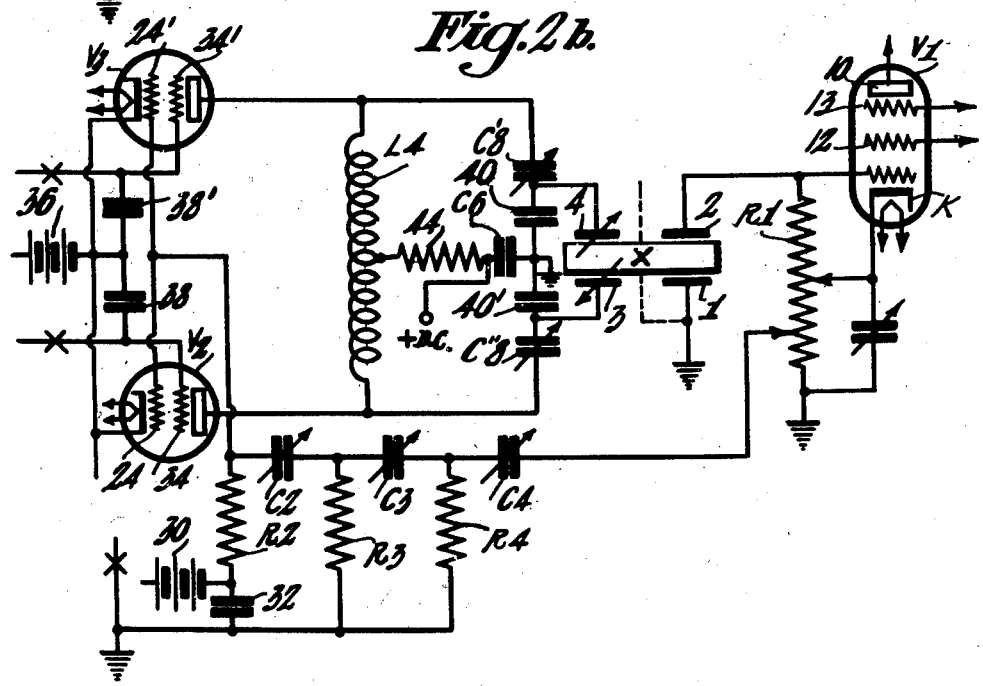

The embodiment of Fig. 2b likewise is similar to the embodiment of Fig. 1 except for the tank circuit including inductance L4. This inductance is again tuned by condensers C'8 and C''8 and coupling condensers 40 and 40' connected as shown across the inductance L4, the capacitance of condensers 40 and 40' being considered in dimensioning the tuning condensers C'8 and C''8.

The resistor 44 is used to prevent split tuning of the tank circuit L4—C'8—40 since the midpoint of the condenser combination is connected to ground. The electrodes 3 and 4 are tapped across part of the tank circuit capacitive impedance to reduce the crystal coupling to the modulator tank circuit. This may be desirable in some cases to prevent the changes of modulator tube constants and other stray capacity and R. F. pickup, from affecting the crystal average frequency. Crystal electrodes 3 and 4 may be made variable in spacing also to adjust the coupling of the modulators to the crystal, since each crystal usually has an optimum value of excitation beyond which it may break over into another mode of oscillation.

I claim:

1. In apparatus of the class described, an electron discharge device having electrodes including an electron receiving electrode, an electron flow control electrode, and an electron stream producing electrode coupled in an oscillation generating circuit including a frequency determining reactance, connections for coupling an output circuit to said device, a pair of electron discharge tube systems each having a control electrode, a cathode and an anode, a phase shifting network coupling the control electrodes and cathodes of said pair of electron tube systems in parallel and to said oscillation generating circuit for impressing on said control electrodes excitation voltages of like phase and of the generated oscillation frequency, a separate reactive circuit coupling the anodes of said tube systems in pushpull relation, a differential coupling between said separate reactive circuit and said reactance of said oscillation generating circuit, and connections for differentially controlling the gain of said pair of electron discharge tubes to correspondingly modulate the timing of the oscillations generated.

2. In apparatus of the class described, an electron discharge device having electrodes including an electron receiving electrode, an electron flow control electrode, and an electron stream producing electrode coupled in an oscillation generating circuit including a frequency determining reactance in the form of a piezo-electric crystal in a holder having a plurality of pairs of terminals one pair of which includes the crystal in the generating circuit, connections for coupling an output circuit to said device, a pair of electron discharge tube systems each having a control electrode, a grid-like electrode, a cathode and an anode, a phase shifting network coupling the control electrodes and cathodes of said pair of electron tube systems in parallel and to said oscillation generating circuit for impressing on said control electrodes excitation voltages of like phase and of the generated frequency, a parallel tuned circuit including an inductance coupling the anodes of said tube systems in pushpull relation, couplings between points of opposed polarity on said inductance and another pair of the terminals of the crystal holder, and connections to said grid-like electrodes for differentially controlling the gains of said pair of electron discharge tubes to correspondingly modulate the timing of the oscillations generated.

3. In apparatus of the class described, an electron discharge device having electrodes including an electron receiving electrode, an electron flow control electrode, and an electron stream producing electrode coupled in an oscillation generating circuit including a piezo-electric crystal in a holder having two pairs of terminals one pair of which includes the crystal in the oscillation generating circuit, connections for coupling an output circuit to said oscillation generating circuit, a pair of electron discharge tube systems each having a control electrode, a cathode and an anode, a phase shifting network coupling the control electrodes and cathodes of said pair of electron tube systems in parallel and to said oscillation generating circuit for impressing on said control electrodes excitation voltages of like phase and of the generated frequency, a tuned circuit coupling the anodes of said tubes in pushpull relation, a differential coupling between the anodes of said tubes and the other pair of electrodes of said crystal holder, and connections for differentially controlling the gain of said pair of electron discharge tubes to correspondingly modulate the timing of the oscillations generated.

4. In apparatus of the class described, an electron discharge device having electrodes including an electron receiving electrode, an electron flow control electrode, and an electron stream producing electrode coupled in an oscillation generating circuit including a crystal, in a holder having a plurality of terminals two of which include said crystal in said oscillation generating circuit, connections for coupling, an output circuit to said device, a pair of electron discharge tube systems each having a control electrode, a grid-like electrode, a cathode and an anode, a phase shifting network coupling the control electrodes and cathodes of said pair of electron tube systems in parallel and to said oscillation generating circuit for impressing on said control electrodes excitation voltages of like phase and of the generated frequency, a reactive circuit coupling the anodes of said tube systems in pushpull relation, a differential coupling between said reactive circuit and said oscillation generating circuit through a pair of terminals of said crystal, and connections to said grid-like electrodes for differentially controlling the gains of said pair of electron discharge tubes to correspondingly modulate the timing of the oscillations generated.

GEORGE L. USSELMAN.

REFERENCES CITED

The following references are of record in the file of this patent:

UNITED STATES PATENTS

| Number | Name | Date |
| --- | --- | --- |
| 2,111,603 | Usselman | Mar. 22, 1938 |
| 2,342,708 | Usselman | Feb. 29, 1944 |